United States Patent
Kitamura et al.

[11] Patent Number: 5,900,309
[45] Date of Patent: May 4, 1999

[54] FINE RESIN PARTICLES USED FOR A LIGHT DIFFUSING SHEET AND A LIGHT DIFFUSING SHEET

[75] Inventors: Manabu Kitamura, Kurita-gun; Hironobu Toribuchi, Suita, both of Japan

[73] Assignee: Nippon Shokubai Co., Ltd., Osaka, Japan

[21] Appl. No.: 08/770,721

[22] Filed: Dec. 19, 1996

[30] Foreign Application Priority Data

Dec. 20, 1995 [JP] Japan .................................. 7-331914

[51] Int. Cl.$^6$ ........................................................ B32B 5/16
[52] U.S. Cl. .......................... 428/212; 428/213; 428/327; 428/331; 428/913

[58] Field of Search ...................................... 428/327, 331, 428/407, 212, 213, 913, 918

[56] References Cited

FOREIGN PATENT DOCUMENTS

| | | |
|---|---|---|
| 6-67003 | 3/1994 | Japan . |
| 7-27904 | 1/1995 | Japan . |
| 7-5305 | 1/1995 | Japan . |
| 7-19995 | 6/1995 | Japan . |

*Primary Examiner*—H. Thi Le
*Attorney, Agent, or Firm*—Oblon, Spivak, McClelland, Maier & Neustadt, P.C.

[57] ABSTRACT

Transparent or semitransparent fine resin particles used for a light diffusing sheet contains smectites.

15 Claims, 1 Drawing Sheet

FINE RESIN PARTICLES USED FOR A LIGHT DIFFUSING SHEET AND A LIGHT DIFFUSING SHEET

DESCRIPTION OF PRIOR ART AND RELATED ART STATEMENTS

The present invention relates to fine resin particles which, when used for a light diffusing material of a light diffusing sheet, are capable of improving the luminance of the light diffusing sheet and also to a light diffusing sheet the luminance of which is improved by using such fine resin particles.

Liquid crystal displays are widely used in a variety of fields including a word processor field and a personal computer field. In these liquid crystal displays, an image is generally displayed by supplying a light from a backlight provided behind a liquid crystal display panel to the liquid crystal display panel. The backlight used in these liquid crystal displays are required to supply as much light as possible to the liquid crystal display panel at a uniform rate in order to make the displayed image easily visible. In order to respond to such a demand, a light diffusing sheet is used as an element for the construction of the backlight.

The construction of the backlight is described with reference to FIG. 1. FIG. 1 is a schematic diagram showing the basic construction of the backlight. In FIG. 1, identified by 1 is a light source, by 2 a reflection sheet for the backlight, by 3 a light transmitting plate and by 4 a light diffusing sheet made of, e.g. synthetic resin. In this construction, the light source 1 is arranged at the side of the light transmitting plate 3. Light from the light source 1 is incident on the light transmitting plate 3, and is introduced to a liquid crystal display panel (not shown) arranged in front of (at an upper side in FIG. 1) the light diffusing sheet 4 via the light diffusing sheet 4 provided on the surface of the light transmitting plate 3. Although a single light source 1 is arranged at the side of the light transmitting plate 3 in the construction shown in FIG. 1, two or more light sources may be arranged at the opposite sides of the light transmitting plate 3 and/or between the light transmitting plate 3 and the reflection sheet 2.

Regardless of which construction is adopted, the light diffusing sheet 4 is used to meet the above demand for the backlight. A variety of sheets have been proposed as such light diffusing sheets. For example, Japanese Unexamined Patent Publications Nos. 7-27904 and 7-5305 disclose light diffusing sheets formed by dispersing fine resin particles in a transparent resin sheet or by applying fine resin particles to the surface of a transparent resin sheet together with a resin binder so as to take advantage of a light diffusing property of the fine resin particles.

The known light diffusing sheets have a satisfactory light diffusing property, but has an insufficient luminance. In other words, the liquid crystal displays are required to improve the luminous efficiency of the backlight and to reduce a power to be consumed in order to be made smaller. Accordingly, the light diffusing sheets need to ensure a sufficient luminance.

In view of the above, an object of the present invention is to provide a light diffusing sheet which ensures a sufficient luminance while maintaining a satisfactory light diffusing property and fine resin particles used for the formation of such a light diffusing sheet.

The fine resin particles according to the invention which could accomplish the above object are fine resin particles for a light diffusing sheet. Specifically, the inventive fine resin particles are such that smectites are contained in transparent or semitransparent fine resin particles.

Preferably, the content of smectites is 0.01 to 20 weight %, and the average diameter of the fine resin particles is 1 to 500 μm.

A desired light diffusing sheet can be formed (1) by applying the above fine resin particles at least to one surface of a transparent substrate together with a resin binder and (2) by dispersing the above fine resin particles in a resin sheet.

The thickness of a coating obtained by applying the fine resin particles together with the resin binder is preferably larger than the average diameter of the fine resin particles, but smaller than twice the average diameter of the fine resin particles.

Further, a ratio of the resin binder to the fine resin particles preferably lies within a range defined by 70 to 3 weight parts of the resin binder and 30 to 97 weight parts of fine resin particles.

These and other objects, features and advantages of the present invention will become more apparent upon a reading of the following detailed description and accompanying drawings.

DETAIL DESCRIPTION OF THE PREFERRED EXAMPLES OF THE INVENTION

Figure 1:
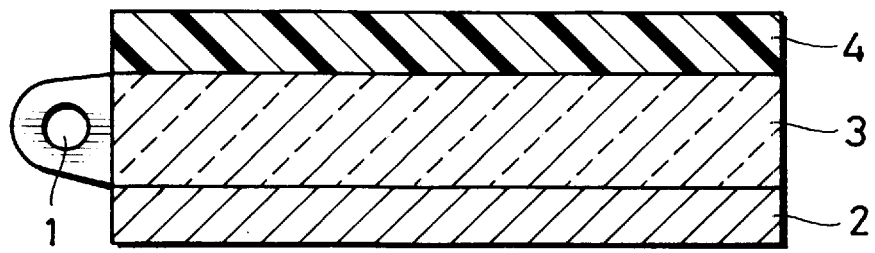
FIG. 1 is a schematic diagram showing the basic construction of a backlight.

The inventors of the present invention studied basically a flight diffusing sheet made of fine resin particles, and their study extended to forms of fine resin particles useful in improving the luminance of the light diffusing sheet from various angles. As a result, they found out that the luminance of the light diffusing sheet can be remarkably improved if fine resin particles containing smectites are used as a light diffusing material of the light diffusing sheet and completed the invention.

Smectite group used in the present invention generally refer to a kind of layered swelling clay minerals and have a layered structure in which unit crystal layers are placed one over another. Since the unit crystals are relatively weakly bonded, a variety of ions and molecules can be inserted between the unit crystals by a physical or chemical method without destroying the structure of the unit crystal layers.

Smectite group (hereinafter simply referred to as "smectites") have a property that an in-plane refractive index and a refractive index in thickness direction are different, and are of the type which has a unit crystal structure: a three layer structure in which an octahedral layer having aluminum, magnesium or the like as a center metal is sandwiched by tetrahedral layers of silica. Smectites have exchangeable cations (for example, $H^+$, $Na^+$, $K^+$, $Ca^{2+}$, $Mg^{2+}$, $Al^{3+}$, $NH_4^+$, quaternary ammonium ion).

If the fine resin particles according to the invention are used as a light diffusing material of the light diffusing sheet, the luminance of the light diffusing sheet can remarkably be improved. Although why this effect can be obtained is not clear, it may be based on the following reasons. Since the refractive index of the resin constituting the fine resin particles and that of smectites are different, the light diffusing sheet has retractive anisotropy. Accordingly, light is introduced in the vertical direction of the light diffusing sheet (i.e. toward the liquid crystal display panel) to improve the luminance. Further, smectites have a planar structure: a unit crystal layer, the unit crystal layer is oriented in parallel with respect to the surface of the fine resin particles and randomly oriented in a plane. The luminance is considered to be improved also for this reason.

Resins used for the fine resin particles according to the invention are not particularly specified provided they are transparent or semitransparent. For example, these resins may be polyolefins such as polyethylene and polypropylene, homopolymers such as polyester, polystyrene, poly(meth) acrylic ester, thermoplastic resins such as copolymers of monomers constituting the above polymers and copolymers of these monomers and monomers copolymerizable therewith, or thermosetting resins such as melamine resins. As a method for producing the fine resin particles, there can be adopted a method for kneading and crushing a resin and smectites, a method for dispersedly mixing smectites into a resin solution and then dry-granulating the mixture by spray drying, an emulsion polymerization method, a suspension polymerization method, a dispersion polymerization method, or a precipitation polymerization method for adding smectites into monomers and causing them to be emulsified, dispersed or dissolved in a solvent for the polymerization, or other suitable known method.

The fine resin particles according to the invention are such that smectites are contained in fine particles made of a variety of resins as described above. The content of smectites is preferably about 0.01 to 20 weight %, and more preferably about 0.1 to 15 weight %. The form of smnectites in the fine resin particles is not particularly specified. Smectites may be uniformly dispersed, localized in the center of the particles, or localized in the vicinity of the surfaces of the particles. Smectites may also exist in the form of a primary or secondary aggregate. In view of the affinity and dispersibility of smectites with the resin constituting the fine resin particles, smectites used preferably have a lipophilic property. Further, surface processing may be applied to smectites by a known method.

The shape of the fine resin particles according to the invention are not particularly specified. For example, the fine resin particles may have a spherical shape, an ellipsoidal shape, (atode), a thin plate-like shape or a needle-like shape. In the case of e.g. spherical fine resin particles, an average diameter (maximum length for the other shape) is about 0.1 to 500 $\mu$m, preferably 0.5 to 100 $\mu$m, and more preferably 1 to 50 $\mu$m. It should be noted that the size of the fine resin particles needs to be suitably selected according to the thickness of a coating to be described later and that of the resin sheet.

Figure 2:
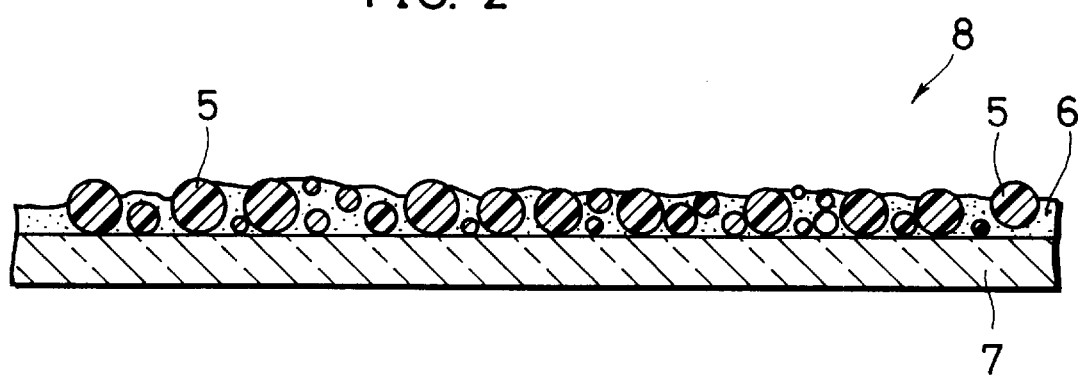
FIG. 2 is a schematic diagram showing an example of a light diffusing sheet according to the invention.

The construction of the light diffusing sheet according to the invention is described with reference to FIG. 2. FIG. 2 is a schematic diagram showing an example of the light diffusing sheet according to the invention. In FIG. 2, identified by 5 are fine resin particles containing smectites, by 6 a resin binder, by 7 a transparent substrate, and by 8 a light diffusing sheet. In this construction, the fine resin particles 5 are applied to one surface of the transparent substrate 7 together with the resin binder 6 to form the light diffusing sheet 8.

The resin binder 6 is required to have transparency, fine resin particles dispersibility, light resistance, moisture resistance, heat resistance and other various properties. The resin binder 6 may be a linear polyester, an acrylic resin, a melamine resin, a silicon resin, an urethane resin, an epoxy resin, a styrene resin, vinyl acetate resin or other resin. A curing agent (isocyanate type), a dispersant, a fluorescent paint or the like may be added to the resin binder 6.

The thickness of the coating of the resin binder 6 is preferably larger than the average diameter of the fine resin particles 5, but smaller than twice the average diameter of the fine resin particles 5. If the coating thickness lies within this range, the fine resin particles are more densely arranged in the coating. If the coating thickness is smaller than the average diameter of the fine resin particles 5, the fine resin particles cannot be applied well. If the coating thickness is larger than twice the average diameter of the fine resin particles 5, the fine resin particles 6 may be arranged in two layers in some parts of the coating, which make their arrangement extremely nonuniform.

Specifically, the thickness of the coating of the resin binder 6 is about 1 to 500 $\mu$m, preferably 2 to 100 $\mu$m, and more preferably 5 to 20 $\mu$m.

On the other hand, any suitable material may be used for the substrate 7 provided its properties required as the substrate 7 such as transparency, heat resistance, resistance to curl, and solvent resistance are satisfied. For example, as the material for the substrate 7, there may be used a variety of resin films such as a polyester resin film, an amorphous polyester resin film, an acrylic resin film, a weather proof vinyl chloride resin film and an embossed polycarbonate resin film as well as glass. The thickness of the substrate 7 is preferably about 75 to 200 $\mu$m. If the substrate 7 has a thickness smaller than 75 $\mu$m, it is likely to curl, making it difficult to handle the substrate 7. If the substrate 7 has a thickness larger than 200 $\mu$m, the luminance cannot be improved to a large extent.

As a method for applying the fine resin particles 5 to the substrate 7 together with the resin binder 6, there may be used a reverse roller coating method, a die coating method, a comma coating method, a spray coating method, a gravure coating method, a kiss reverse coating method and other known methods.

A ratio of the resin binder 6 to the fine resin particles 5 lies within a range defined by 70 to 3 weight parts of the resin binder and 30 to 97 weight parts of fine resin particles, preferably within a range defined by 60 to 15 weight % of the resin binder and 40 to 85 weight % of the fine resin particles, and more preferably within a range defined by 50 to 30 weight % of the resin binder and 50 to 70 weight % of the fine resin particles.

If the ratio of the resin binder 6 to the fine resin particles 5 lies within a range defined by 70 to 3 weight parts of the resin binder and 30 to 97 weight parts of fine resin particles, there can be obtained a satisfactory coating in which the fine resin particles 5 are densely arranged. If the content of the resin binder 6 exceeds 70 weight %, a light diffusing property becomes poor because the fine resin particles 5 are not densely arranged. If the content of the fine resin particles 5 exceeds 97 weight %, the adhesive strength of the coating becomes poor and the ray transmission thereof becomes too low, with the result that luminance cannot be improved.

As the resin used for the resin binder and the substrate and the resin constituting the fine resin particles, the same kind of or different kinds of resins may be used according to the application such as an application to color liquid crystals and an application to monochromatic liquid crystals.

Figure 3:
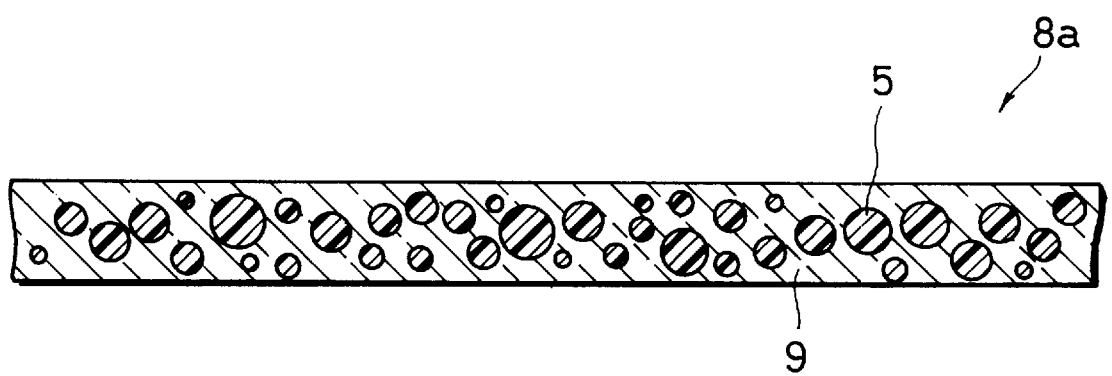
FIG. 3 is a schematic diagram showing another example of the light diffusing sheet according to the invention.

FIG. 3 is a schematic diagram showing another example of the light diffusing sheet according to the invention. In this construction, a light diffusing sheet 8a is formed by directly dispersing the fine resin particles 5 according to the invention in a resin sheet 9. The object of the invention can also be accomplished by this construction. A variety of resin films mentioned as the material of the substrate 7 may be used for the resin sheet 9. As a method for producing the resin film, there may be adopted an inflation processing, a calendar processing, T-die processing and other methods.

Hereafter, the invention is described in detail with reference to examples. The examples are not of the nature that restricts the invention, and any design changes made in the examples are also embraced by the technical scope of the invention.

EXAMPLE 1

900 parts of deionized water in which 0.5 parts of polyoxyethylene alkylphenyl ether sulfoammonium ("Hitenol N-08" produced by Dai-ichi Kogyo Seiyaku Co., Ltd.) were prepared in a flask provided with an agitator, an inert gas admittance pipe, a reflux cooler and a thermometer. An already prepared mixture of 85 parts of methyl methacrylate, 10 parts of trimethylolpropane trimethacrylate, and 5 parts of smectites (lipophilic smectites, "SAN" produced by Co-op Chemical Co., Ltd.) was then put into the flask. The mixture in the flask was agitated at 3000 rpm by an agitator ("T. K. Homogenizer" produced by Tokushu Kika Kogyo Co., Ltd.) into a uniform suspension.

Subsequently, the suspension was heated to 75° C. while a nitrogen gas was admitted into the flask via the inert gas admittance pipe. The suspension was cooled after being allowed to undergo a polymerization reaction at this temperature for 5 hours. The suspension was dried to obtain smectites containing fine resin particles (1) after being filtered and washed. The average diameter of the obtained smectites containing fine resin particles (1) was 5 μm.

The smectites containing fine resin particles (1) was applied to a polyester film ("Diafoil O-300E" produced by Diafoil Co., Ltd.) substrate having a thickness of 100 μm together with a linear saturated polyester resin ("Bylon 24SS" produced by Toyobo Co., Ltd.) as a resin binder by a die coating method to form a light diffusing sheet (1) constructed as shown in FIG. 2. The ratio of the resin binder to the smectites containing fine resin particles (1) was 45 to 55 weight parts.

The total ray transmission, diffuser efficiency, haze factor, parallel ray transmission and luminance of the obtained light diffusing sheet (1) were measured. The total ray transmission, diffuser efficiency, haze factor and parallel ray transmission were all measured by a haze meter "NDH1001DP" manufactured by Nippon Denshoku Co., Ltd., whereas the luminance was measured according to the following method.

(Luminance Measuring Method)

Two light diffusing sheets (1) were placed one over the other on a light transmitting plate formed with screen printing dots. Light was emitted sideways of the light transmitting plate (see FIG. 1) from a cathode ray tube of a diameter of 5 mm as a light source. An amount of light having transmitted through the light transmitting plate and the two light diffusing sheets (1) was measured by a luminance meter ("SL110" manufactured by Minolta Co., Ltd.) fixed in a position spaced apart from the light diffusing sheets (1) by 30 cm.

The measurement results are shown in TABLE-1 below together with the average diameter of the smectites containing fine resin particles (1), the residual content of smectites and the thickness of the resin binder coating.

EXAMPLE 2

Smectites containing fine resin particles (2) were obtained in the same manner as in the first example except that 87 parts of methyl methacrylate and 3 parts of smectites (same as above) were used.

Light diffusing sheets (2) were formed in the same manner as in the first example using the smectites containing fine resin particles (2), and estimations similar to those in the first example were made.

The estimation results are shown in TABLE-1 below.

EXAMPLE 3

In a flask similar to the one used in the first example, 900 parts of deionized water in which 2 parts of polyvinyl alcohol ("PVA-205" produced by Kuraray Co., Ltd.) were prepared. An already prepared mixture of 89 parts of methyl methacrylate, 10 parts of trimethylolpropane trimethacrylate, and 1 part of smectites (lipophilic smectites, "SAN" produced by Co-op Chemical Co., Ltd.) was then added in the flask. The mixture in the flask was agitated at 500 rpm into a uniform suspension.

Subsequently, the suspension was heated to 75° C. while agitation was continued and a nitrogen gas was admitted into the flask via an inert gas admittance pipe. The suspension was cooled after being allowed to undergo a polymerization reaction at this temperature for 5 hours. The suspension was dried to obtain smectites containing fine resin particles (3) after being filtered and washed. The average diameter of the obtained smectites containing fine resin particles (3) was 10 μm.

Light diffusing sheets (3) were formed in the same manner as in the first example using the smectites containing fine resin particles (3), and estimations similar to those in the first example were made.

The estimation results are shown in TABLE-1 below.

EXAMPLE 4

Smectites containing fine resin particles (4) were obtained in the same manner as in the third example except that 87 parts of methyl methacrylate and 3 parts of smectites (same as above) were used.

Light diffusing sheets (4) were formed in the same manner as in the third example using the smectites containing fine resin particles (4), and estimations similar to those in the third example were made.

The estimation results are shown in TABLE-1 below.

EXAMPLE 5

Smectites containing fine resin particles (5) were obtained in the same manner as in the third example except that 85 parts of methyl methacrylate and 5 parts of smectites (same as above) were used.

Light diffusing sheets (5) were formed in the same manner as in the third example using the smectites containing fine resin particles (5), and estimations similar to those in the third example were made.

The estimation results are shown in TABLE-1 below.

EXAMPLE 6

Smectites containing fine resin particles (6) were obtained in the same manner as in the third example except that 83 parts of methyl methacrylate and 7 parts of smectites (same as above) were used.

Light diffusing sheets (6) were formed in the same manner as in the third example using the smectites containing fine resin particles (6), and estimations similar to those in the third example were made.

The estimation results are shown in TABLE-1 below.

EXAMPLE 7

In a flask similar to the one used in the first example, 900 parts of deionized water in which 2 parts of polyvinyl alcohol ("PVA-205" produced by Kuraray Co., Ltd.) were prepared. An already prepared mixture of 87 parts of methyl methacrylate, 10 parts of trimethylolpropane trimethacrylate, and 3 part of smectites (lipophilic smectites, "SPN" produced by Co-op Chemical Co., Ltd.) was then added in the flask. The mixture in the flask was agitated at 500 rpm into a uniform suspension.

Subsequently, the suspension was heated to 75° C. while agitation was continued and a nitrogen gas was admitted into the flask via an inert gas admittance pipe. The suspension was cooled after being allowed to undergo a polymerization reaction at this temperature for 5 hours. The suspension was dried to obtain smectites containing fine resin particles (7) after being filtered and washed. The average diameter of the obtained smectites containing fine resin particles (7) was 10 μm.

Light diffusing sheets (7) were formed in the same manner as in the first example using the smectites containing fine resin particles (7), and estimations similar to those in the first example were made.

The estimation results are shown in TABLE-1 below.

EXAMPLE 8

Smectites containing fine resin particles (8) were obtained in the same manner as in the seventh example except that 85 parts of methyl methacrylate and 5 parts of smectites (same as above) were used.

Light diffusing sheets (8) were formed in the same manner as in the seventh example using the smectites containing fine resin particles (8), and estimations similar to those in the seventh example were made.

The estimation results are shown in TABLE-1 below.

EXAMPLE 9

Smectites containing fine resin particles (9) were obtained in the same manner as in the seventh example except that 83 parts of methyl methacrylate and 7 parts of smectites (same as above) were used.

Light diffusing sheets (9) were formed in the same manner as in the seventh example using the smectites containing fine resin particles (9), and estimations similar to those in the seventh example were made.

The estimation results are shown in TABLE-1 below.

Comparative Example 1

In a flask similar to the one used in the first example, 900 parts of deionized water in which 2 parts of polyvinyl alcohol ("PVA-205" produced by Kuraray Co., Ltd.) were prepared. An already prepared mixture of 90 parts of methyl methacrylate and 10 parts of trimethylolpropane trimethacrylate was then added in the flask. The mixture in the flask was agitated at 500 rpm into a uniform suspension.

Subsequently, the suspension was heated to 75° C. while agitation was continued and a nitrogen gas was admitted into the flask via an inert gas admittance pipe. The suspension was cooled after being allowed to undergo a polymerization reaction at this temperature for 5 hours. The suspension was dried to obtain comparative fine resin particles (1) after being filtered and washed. The average diameter of the obtained comparative fine resin particles (1) was 10 μm.

Comparative light diffusing sheets (1) were formed in the same manner as in the first example using the comparative fine resin particles (1), and estimations similar to those in the first example were made.

The estimation results are shown in TABLE-1 below.

Comparative Example 2

Comparative light diffusing sheets (2) were formed in the same manner as in the first example except that the ratio of the resin binder to the smectites containing fine resin particles (1) of the first example was 2 to 98 weight parts, and estimations similar to those in the first example were made.

The estimation results are shown in TABLE-1 below.

Comparative Example 3

Comparative light diffusing sheets (3) were formed in the same manner as in the second comparative example except that the ratio of the resin binder to the smectites containing fine resin particles (1) was 80 to 20 weight parts, and estimations similar to those in the second comparative example were made.

The estimation results are shown in TABLE-1 below.

Comparative Example 4

Comparative light diffusing sheets (4) were formed in the same manner as in the seventh example except that the ratio of the resin binder to the smectites containing fine resin particles (7) of the seventh example was 2 to 98 weight parts, and estimations similar to those in the seventh example were made.

The estimation results are shown in TABLE-1 below.

Comparative Example 5

Comparative light diffusing sheets (5) were formed in the same manner as in the fourth comparative example except that the ratio of the resin binder to the smectites containing fine resin particles (7) was 80 to 20 weight parts, and estimations similar to those in the fourth comparative example were made.

The estimation results are shown in TABLE-1 below.

TABLE 1

| A | B | C | D | E | F | G | H | I |
|---|---|---|---|---|---|---|---|---|
| Exa. 1 | 5 | 5.0 | 8 | 70.5 | 62.3 | 88.3 | 8.2 | 834 |
| Exa. 2 | 5 | 3.0 | 8 | 73.1 | 64.1 | 87.6 | 9.0 | 801 |
| Exa. 3 | 10 | 1.0 | 12 | 73.9 | 64.0 | 86.5 | 9.9 | 790 |
| Exa. 4 | 10 | 3.0 | 12 | 70.5 | 62.0 | 87.6 | 8.3 | 820 |
| Exa. 5 | 10 | 5.0 | 12 | 73.7 | 53.4 | 72.4 | 20.2 | 720 |
| Exa. 6 | 10 | 7.0 | 12 | 74.1 | 56.0 | 75.5 | 18.1 | 708 |
| Exa. 7 | 10 | 3.0 | 12 | 70.8 | 62.3 | 88.0 | 8.4 | 835 |
| Exa. 8 | 10 | 5.0 | 12 | 74.5 | 59.1 | 79.3 | 15.4 | 738 |
| Exa. 9 | 10 | 7.0 | 12 | 71.2 | 61.5 | 86.3 | 9.7 | 729 |
| C.E. 1 | 10 | — | 12 | 77.6 | 66.7 | 85.8 | 10.9 | 695 |
| C.E. 2 | 5 | 5.0 | 8 | 59.5 | 56.0 | 92.3 | 7.3 | 683 |
| C.E. 3 | 5 | 5.0 | 8 | 89.0 | 43.0 | 68.2 | 25.0 | 638 |
| C.E. 4 | 10 | 3.0 | 12 | 58.3 | 57.3 | 93.4 | 7.6 | 681 |
| C.E. 5 | 10 | 3.0 | 12 | 88.7 | 42.7 | 67.6 | 25.3 | 627 |

TABLE 1-continued

| A | B | C | D | E | F | G | H | I |
|---|---|---|---|---|---|---|---|---|

A: Example number
B: Average diameter of fine resin particles (μm)
C: residual content of smectites (weight %)
D: Resin binder coating thickness (μm)
E: Total ray transmission (%)
F: Diffused ray transmission (%)
G: Haze factor
H: Parallel ray transmission (%)
I: Luminance (cd/m$^2$)

As is clear from TABLE-1, the light diffusing sheet made of the smectites containing fine resin particles according to the invention has a remarkably better luminance than the light diffusing sheet made of only the fine resin particles, and the light dispersibility thereof indicated by the diffuser efficiency is not considerably reduced. The properties confirmingly vary even in the cases where the average diameter of the fine resin particles, the residual content of smectites and the coating thickness are same (cf. Examples 5 and 8, and Examples 6 and 9). This is considered to result from a difference in the form of smectites in the fine resin particles.

As described above, according to the invention, there could be obtained a light diffusing sheet which ensures a sufficient luminance while substantially maintaining a satisfactory light diffusing property and fine resin particles used for the formation of such a light diffusing sheet.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A particle for use in a light diffusing sheet, said particle comprising a resin and a smectite.

2. The particle according to claim 1, wherein said smectite is present in an amount of 0.01 to 20 weight percent.

3. The particle according to claim 1, wherein said particle has a size of 1 to 500 μm.

4. The particle according to claim 1, wherein an in-plane refractive index and a refractive index in a thickness direction of said smectite are different from each other; and wherein said smectite has a unit crystal structure.

5. The particle according to claim 1, wherein said resin is a transparent polymer.

6. A light diffusing sheet comprising:

a transparent substrate;

a plurality of light diffusing particles placed over said transparent substrate, each particle comprising a resin and a smectite; and a resin binder which binds the plurality of light diffusing particles with the transparent substrate; wherein the weight ratio of said resin binder to said particle comprising a smectite is 3:97 to 70:30.

7. The light diffusing sheet according to claim 6, wherein each of the light diffusing particles contains 0.01 to 20 weight percent of said smectite.

8. The light diffusing sheet according to claim 6, wherein each of the light diffusing particles has a size of 1 to 500 μm.

9. The light diffusing sheet according to claim 6, wherein an in-plane refractive index and a refractive index in a thickness direction of said smectite are different from each other; and wherein said smectite has a unit crystal structure.

10. The light diffusing sheet according to claim 6, wherein said resin is a transparent polymer.

11. A light diffusing sheet comprising:

a transparent resin sheet; and a plurality of light diffusing particles placed in the transparent resin sheet wherein said diffusing particles are resin particles in which smectites are contained.

12. The light diffusing sheet according to claim 11, wherein each of said particles comprises 0.01 to 20 weight percent of a smectite.

13. The light diffusing sheet according to claim 11, wherein said particles have a size of 1 to 500 μm.

14. The light diffusing sheet according to claim 11, wherein an in-plane refractive index and a refractive index in a thickness direction of said smectite are different from each other; and wherein said smectite has a unit crystal structure.

15. The light diffusing sheet according to claim 11, wherein said resin is a transparent polymer.

\* \* \* \* \*